(12) United States Patent
Kochesfahani et al.

(10) Patent No.: US 10,316,186 B2
(45) Date of Patent: Jun. 11, 2019

(54) ENGINEERING MINERALS FOR USE AS POLYCARBONATE FILLERS, AND METHODS OF USING THE SAME TO REINFORCE POLYCARBONATES

(71) Applicant: Imerys Talc America, Inc., Roswell, GA (US)

(72) Inventors: Saied Kochesfahani, San Jose, CA (US); Edward McCarthy, Morgan Hill, CA (US); Parashar Dave, West Lafayette, IN (US); Anna Borchert, San Jose, CA (US); Michele Laperna Wong, Redwood City, CA (US); Maziyar Bolourchi, Los Gatos, CA (US); Michael Schmidt, St. Oswald (AT)

(73) Assignee: Imerys Talc America, Inc., Roswell, GA (US)

( * ) Notice: Subject to any disclaimer, the term of this patent is extended or adjusted under 35 U.S.C. 154(b) by 0 days.

(21) Appl. No.: 15/547,362

(22) PCT Filed: Jan. 29, 2016

(86) PCT No.: PCT/US2016/015728
§ 371 (c)(1),
(2) Date: Jul. 28, 2017

(87) PCT Pub. No.: WO2016/123526
PCT Pub. Date: Aug. 4, 2016

(65) Prior Publication Data
US 2018/0037735 A1    Feb. 8, 2018

Related U.S. Application Data

(60) Provisional application No. 62/109,171, filed on Jan. 29, 2015.

(51) Int. Cl.
| C08G 63/02 | (2006.01) |
| C08L 69/00 | (2006.01) |
| C08L 33/08 | (2006.01) |
| C08G 64/08 | (2006.01) |
| C08K 3/34 | (2006.01) |
| C08K 5/5415 | (2006.01) |
| C08L 33/10 | (2006.01) |
| C08L 33/24 | (2006.01) |

(52) U.S. Cl.
CPC ............ C08L 69/00 (2013.01); C08G 64/085 (2013.01); C08K 3/34 (2013.01); C08K 5/5415 (2013.01); C08L 33/08 (2013.01); C08L 33/10 (2013.01); C08L 33/24 (2013.01)

(58) Field of Classification Search
USPC .................................................. 528/196, 198
See application file for complete search history.

(56) References Cited

U.S. PATENT DOCUMENTS

| 4,172,735 A | 10/1979 | Wegerhoff et al. |
| 4,943,324 A | 7/1990 | Bundy et al. |
| 6,569,527 B1 | 5/2003 | Calhoun et al. |
| 2001/0014705 A1 | 8/2001 | Tungare et al. |
| 2001/0050217 A1 | 12/2001 | Uehara et al. |
| 2005/0267277 A1 | 12/2005 | Takahama et al. |
| 2006/0199879 A1 | 9/2006 | Agarwal |
| 2007/0045893 A1 | 3/2007 | Asthana et al. |
| 2007/0072960 A1 | 3/2007 | Ma et al. |
| 2007/0138702 A9 | 6/2007 | Matthijssen et al. |
| 2010/0004381 A1 | 1/2010 | Avakian et al. |
| 2013/0164154 A1 | 6/2013 | Tu et al. |
| 2013/0164653 A1 | 6/2013 | Gonon et al. |
| 2014/0051782 A1 | 2/2014 | Cheetham et al. |
| 2014/0200303 A1 | 7/2014 | Steendam et al. |

FOREIGN PATENT DOCUMENTS

| EP | 0440442 A1 | 8/1991 |
| KR | 2007 0116789 | 12/2007 |
| KR | 2008 0028373 | 3/2008 |
| WO | WO 82/02398 | 7/1982 |
| WO | WO 2014/001158 A1 | 1/2014 |

OTHER PUBLICATIONS

Extended European Search Report dated Jul. 16, 2018, in corresponding EP Application No. 16744208.6, 6 pages.
International Search Report and Written Opinion dated May 31, 2016, in International Application No. PCT/US2016/015728 (13 pgs.).

*Primary Examiner* — Terressa Boykin
(74) *Attorney, Agent, or Firm* — Finnegan, Henderson, Farabow, Garrett & Dunner LLP

(57) ABSTRACT

A reinforced resin composition may include a polycarbonate, a functionalizing agent, and an inorganic filler that has been functionalized with the functionalizing agent, the functionalized inorganic filler being present in an amount ranging from 1 to 25 percent by weight of the resin composition. The reinforced resin may exhibit a melt flow index of 25 or less, when measured at a load of 1.2 kg, after allowing the resin to remain at a temperature of 300° C. for 10 minutes. A method of reducing thermal degradation of a reinforced polycarbonate material may include introducing into said polycarbonate material at least one inorganic filler functionalized with a functionalizing agent, such that the reinforced resin exhibits a melt flow index of 25 or less, when measured at a load of 1.2 kg, after allowing the resin to remain at a temperature of 300° C. for 10 minutes.

20 Claims, No Drawings

ENGINEERING MINERALS FOR USE AS POLYCARBONATE FILLERS, AND METHODS OF USING THE SAME TO REINFORCE POLYCARBONATES

CLAIM FOR PRIORITY

This application is a U.S. National phase entry of International Application No. PCT/US2016/015728, filed Jan. 29, 2016, which claims the benefit of priority of U.S. Provisional Patent Application No. 62/109,171, filed Jan. 29, 2015, to both of which this application claims the benefit of priority and the subject matter of both of which is incorporated herein by reference in its entirety.

FIELD

The present disclosure generally relates to a reinforced resin composition having improved thermal degradation properties comprising a polycarbonate and at least one functionalized inorganic filler. Methods of reinforcing resin compositions consistent with the foregoing are also disclosed.

BACKGROUND

Polycarbonate (PC) resins have been used as an engineering plastic in numerous applications that take advantage of the resin's various beneficial properties including impact resistance, heat resistance, and dimensional stability. The use of reinforcing additives for polycarbonate has been limited primarily to glass fiber, due to the tendency of minerals to contribute to degradation of polycarbonate at elevated temperatures (greater than or equal to 300° C.), which may deteriorate the performance of resulting mineral-PC compounds.

There remains a desire for a mineral reinforcement or filler that is compatible with polycarbonate and does not degrade PC resin at elevated processing temperatures (greater than or equal to 300° C.). The inventors have surprisingly discovered a method of reducing thermal degradation of PC but incorporating into the PC resin, inorganic filler materials whose surface have been modified by at least one functionalizing agent. The inventors have discovered that when the surface of inorganic filler materials has been functionalized to isolate the active sites located thereon, the fillers can be incorporated into a PC resin without adversely affecting the thermal degradation of the PC material.

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

SUMMARY

The present disclosure describes reinforced resin compositions that may have improved thermal degradation properties, as measured by an acceptable melt flow index, comprising a polycarbonate and at least one inorganic filler that has been functionalized with a functionalizing agent. Without being bound by a particular theory, applicants have discovered that a number of variables can lead to improved thermal degradation properties, including the use of lower BET surface area minerals, such as a material having a surface area less than 12 m²/g, an acceptable functionalizing agent attached to the minerals, and a reduced moisture content of the filled polycarbonate material. The moisture content may be reduced by drying the filled polycarbonate material.

There is disclosed a reinforced resin composition may include a polycarbonate in an amount ranging from 75 to 99 percent by weight of the resin composition, a functionalizing agent, and an inorganic filler functionalized with the functionalizing agent, the functionalized inorganic filler being present in an amount ranging from 1 to 25 percent by weight of the resin composition, wherein the reinforced resin may exhibit a melt flow index of 25 or less, when measured at a load of 1.2 kg, after allowing the resin to remain at a temperature of 300° C. for 10 minutes.

Furthermore, according to another aspect, a method for reinforcing a resin composition may provide improved thermal degradation properties, as measured by an acceptable melt flow index. The method may include adding to a polycarbonate resin at least one inorganic filler that has been functionalized with a functionalizing agent.

In another aspect, a method of reducing thermal degradation of a reinforced polycarbonate material may include introducing into said polycarbonate material at least one inorganic filler functionalized with a functionalizing agent to modify the surface activity of said inorganic filler, such that the reinforced resin exhibits a melt flow index of 25 or less, when measured at a load of 1.2 kg, after allowing the resin to remain at a temperature of 300° C. for 10 minutes.

Exemplary objects and advantages will be set forth in part in the description which follows, or may be learned by practice of the exemplary embodiments. It is to be understood that both the foregoing general description and the following detailed description are exemplary and explanatory only and are not restrictive of the invention, as claimed.

DETAILED DESCRIPTION

As used herein, "polycarbonate" or "PC" refers to any long-chain linear polyesters of carbonic acid and dihydric phenols, such as bisphenol A. One non-limiting example of a polycarbonate that may be used is Lexan™ from Sabic.

As used herein "unfilled PC resin" refers to polycarbonate resin in which inorganic fillers have not been added.

As used herein, "Melt Flow Index" (MFI) refers to the measure of ease of flow of the melt of a thermoplastic polymer. It is defined as the mass of polymer, in grams, flowing in ten minutes through a capillary of 2.095 mm diameter and 8 mm in length under a 1.2 kg weight for 10 minutes. In the present description, melt flow index was measured at 1.2 kg load at 300° C. after allowing the resin or compound to remain at 300° C. inside the tester for 10 minutes.

It has surprisingly been discovered that a resin composition as described herein and which includes the functionalized inorganic filler, typically exhibits a melt flow index of 30 or less, such as 25 or less, 20 or less, and even 15 or less, which is an indication that the resin has desired thermal degradation properties.

As used herein, the term "talc" means a hydrated magnesium silicate mineral, optionally associated with other minerals, for example, chlorite, dolomite and/or magnesite.

As used herein, the term "functionalization" refers to the addition of functionalizing agent onto the surface of a mineral (inorganic filler) by chemical synthesis methods. A "functionalizing agent" refers to the material that is attached to, or associated with, the surface by functionalization. The functionalizing agent is not necessarily adsorbed onto the surface, but may be connected by a permanent chemical bond, such as by covalent bonding.

As used herein, the term "coated" means particles of the talc are surface treated or contacted with a compound, which adheres (e.g., physisorbed or bonded) or is otherwise associated with the surface of the talc.

As used herein, "specific surface area (BET)" means the area of the surface of the particles of the talc particulate with respect to unit mass, determined according to the BET method by the quantity of argon adsorbed on the surface of said particles so to as to form a monomolecular layer completely covering said surface (measurement according to the BET method, AFNOR standard X11-621 and 622 or ISO 9277). A "low BET surface area mineral" means a material that has a surface area less than 12 $m^2/g$.

The crystalline structure of talc (e.g., microcrystalline or macrocrystalline) may be generally described in relation to a "morphology index" ("M" or "MI"), as described in H. J. Holland and M. J. Murtagh, "An XRD Morphology Index for Talcs: The Effect of Particle Size and Morphology on the Specific Surface Area," *Advances in X-ray Analysis*, Vol. 42, pp. 421-428 (2000). For example, talcs having a relatively high MI may be considered "platy" or "lamellar" talcs and generally may have a macrocrystalline structure, whereas talcs having a relatively lower MI are less platy and may have a microcrystalline structure. As used herein, the term "platy" refers to a talc composition having an MI greater than or equal to about 0.6. According to some embodiments, the morphology index of the talc may be greater than or equal to 0.7, greater than or equal to 0.75, greater than or equal to 0.8, greater than or equal to 0.85, or greater than or equal to 0.9.

Particle size properties referred to herein for the talc particulate materials are as measured in a well-known manner by sedimentation of the particulate material in a fully dispersed condition in an aqueous medium using a Sedigraph 5100 machine as supplied by Micromeritics Instruments Corporation, 30 Norcross, Ga., USA (www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d.), less than given e.s.d. values. The mean particle size $d_{50}$ is the value determined in this way of the particle e.s.d. at which there are 50% by weight of the particles which have an equivalent spherical diameter less than that $d_{50}$ value.

There is disclosed a mineral reinforcement or filler that is compatible with polycarbonate and does not significantly degrade PC resin at elevated processing temperatures (greater than or equal to about 300° C.). In one embodiment there is disclosed a reinforced resin composition comprising, in its simplest form, a polycarbonate and a functionalized inorganic filler.

Polycarbonates suitable for use in the present invention are any of those known in the art, such as the aromatic polycarbonates. Non-limiting examples of such aromatic polycarbonates useful herein are homopolymers, copolymers, and mixtures thereof, which have an intrinsic viscosity of from about 0.3 to about 1.0 dl/g as measured in methylene chloride at 25° C. These polycarbonates are derived from dihydric phenols such as, for example, 2,2-bis(4-hydroxyphenyl)propane; bis(4-hydroxyphenyl)methane; 2,2-bis(4-hydroxy-3-methylphenyl)propane; 4,4-bis(4-hydroxyphenyl)heptane; 2,2-(3,5,3',5'-tetrachloro-4,4'-dihydroxyphenyl)propane; and (3,3'-dichloro-4,4'-dihydroxyphenyl)methane. Other dihydric phenols that are also suitable for use in the preparation of the above polycarbonates are disclosed in U.S. Pat. Nos. 3,334,154 and 4,131,575, which are incorporated by reference herein.

These polycarbonates can be manufactured by known processes, such as, for example, by reacting a dihydric phenol with a carbonate precursor such as phosgene, a haloformate or a carbonate ester, in accordance with methods set forth in the above-cited literature and U.S. Pat. Nos. 4,018,750 and 4,123,436, or by transesterification processes such as disclosed in U.S. Pat. No. 3,153,008, as well as other processes known to those skilled in the art. All of the above-mentioned patents are incorporated herein by reference.

The foregoing polycarbonates also include the polymeric derivatives of a dihydric phenol, a dicarboxylic acid, and a carbonic acid such as disclosed in U.S. Pat. No. 3,169,121, incorporated herein by reference.

In one embodiment, the polycarbonate may be a general purpose, medium viscosity PC resin, e.g., Lexan 141™ sold by Sabic. The polycarbonate materials described herein can be found in the resin composition in an amount ranging from 70 to 99 percent by weight of the resin composition, from 75 to 99 percent, from 80 to 99 percent, from 85 to 99 percent, from 70 to 95 percent, from 70 to 90 percent, from 70 to 85 percent, from 70 to 80 percent, and from 70 to 75 percent.

Inorganic fillers that might be particularly useful in the present invention include talc, mica, kaolin, perlite, and combinations thereof.

Talc is an oleophilic mineral composed of hydrated magnesium silicate generally having the chemical formula $H_2Mg_3(SiO_3)_4$ or $Mg_3Si_4O_{10}(OH)_2$. According to some embodiments, talc may also be chemically described by one or more of the following formulas: $(Si_2O_5)_2Mg_3(OH)_2$, $Si_8Mg_6O_{20}(OH)_4$, or $Mg_{12}Si_{16}O_{40}(OH)_8$. These formulas do not include impurities, which can include inorganics, such as carbonates, other magnesium silicates, ferrous iron compounds, and various organic materials that may be present. Such impurities generally occur in minor amounts, but can occur in larger amounts as well. The impurities found in talcs may vary as to type and amount depending on the geographic source of the talc. There may also be minor elemental substitution of Mg with Fe, or other elements in the crystalline structure of talc.

Talc may be characterized as being either microcrystalline or macrocrystalline in nature. In particular, talc may generally be in the form of individual platelets. The individual platelet size of the talc (e.g., the median particle diameter as measured by the Sedigraph method) of an individual talc platelet (a few thousand elementary sheets) may vary from approximately 1 micron to over 100 microns, depending on the conditions of formation of the talc deposit. Generally speaking, microcrystalline talc has small crystals, which provide a compact, dense ore. Macrocrystalline talc has large crystals in papery layers. In a microcrystalline structure, talc elementary particles are composed of small plates as compared to macrocrystalline structures, which are composed of larger plates.

According to some embodiments, the talc has a Hegman rating of 4 or greater, a Hegman rating of 5 or greater, a Hegman rating of 6 or greater, a Flegman rating of 7 or greater, or a Flegman rating of 7.5 or greater. According to some embodiments, the talc has a BET surface area greater than 2 $m^2/g$, a BET surface area greater than 4 $m^2/g$, a BET surface area greater than 6 $m^2/g$, a BET surface area less than 12 $m^2/g$, or a BET surface area less than 10 $m^2/g$. According to some embodiments, the talc has a BET surface area ranging from 2 m$^2$/g to 12 m$^2$/g, a BET surface area ranging from 4 m$^2$/g to 10 m$^2$/g.

In one embodiment, the inorganic filler comprises a talc from macrocrystalline ores. In various embodiments, the talc has a desired size and morphology. For example, the talc used according to some embodiments may have a d$_{50}$ ranging from 0.5 to 5 µm, such as 2 µm, an aspect ratio of greater than 2.8, and Hegman value about 7.

In some embodiments, the inorganic talc may have a morphology index greater than or equal to 0.6. For example, the talc may have a morphology index greater than or equal to 0.7, greater than or equal to 0.75, greater than or equal to 0.8, greater than or equal to 0.85, greater than or equal to 0.9, or greater than or equal to 0.95.

In one embodiment, the inorganic filler includes a mica chosen from phlogopite mica, muscovite mica, and combinations thereof. Mica refers to any of a group of hydrous potassium, aluminum silicate minerals. It is a type of phyllosilicate, exhibiting a two-dimensional sheet or layer structure.

In one embodiment, the inorganic filler includes kaolin, also referred to as "kaolin clay," "china clay," or "hydrous kaolin," Kaolin contains predominantly the mineral kaolinite, together with small concentrations of various other minerals. Kaolinite may also be generally described as an aluminosilicate, aluminosilicate clay, or hydrous aluminosilicate (Al$_2$Si$_2$O$_5$(OH)$_4$). In one embodiment, the inorganic filler added to the PC material includes a kaolin chosen from calcined kaolin, hydrous kaolin, and combinations thereof.

The inorganic fillers described herein can be found in the resin composition in an amount ranging from 1 to 30 percent by weight of the resin composition, from 1 to 25 percent, from 1 to 20 percent, from 1 to 15 percent, from 1 to 10 percent, from 1 to 5 percent, from 5 to 30 percent, from 10 to 30 percent, from 15 to 30 percent, from 20 to 30 percent, and from 25 to 30 percent.

Similarly, the inorganic filler may have a d$_{50}$ ranging from 0.5 to 15 µm, from 0.5 to 10 µm, from 0.5 to 5 µm, from 1.0 to 15 µm, from 2.0 to 15 µm, from 5.0 to 15 µm, from 10 to 15 µm, and from 5.0 to 10 µm.

According to some embodiments, particularly useful functionalizing agents may include organic groups that could be used to functionalize the inorganic fillers are chosen from organo-modified silanes. In particular, the inventors have discovered that the surface of the inorganic fillers can be functionalized with at least one of methacrylate-silane (MEMO-silane), vinyl silane, phenyl silane, epoxy silane, and combinations thereof.

The functionalizing agents, for example, organic groups, may be functionalized on the surface of the inorganic filler materials in an amount ranging from 0.1 to 3.0 wt % loading based on the dried mineral, such as 0.2 to 3.0 wt %, 0.3 to 3.0 wt %, 0.1 to 2.5 wt %, 0.1 to 2.0 wt %, 0.1 to 1.0 wt %.

In one embodiment, the methacrylate-silane may include 3-methacryl oxypropyl trimethoxysilane (MEMO-silane). The vinyl silane may be chosen from vinyltrimethoxysilane, vinyltriethoxysilane, and combinations thereof. The phenyl silane may include phenytrimethoxysilane. The epoxy silane may include 3-glacidoxypropyl trimethoxysilane.

According to some embodiments, the functionalizing agent may include at least one of modified styrene acrylic polymer, monomeric carbodimide, and polymeric carbodimide. For example, the functionalizing agent may include one or more of the above-referenced organic groups in addition to at least one of modified styrene acrylic polymer, monomeric carbodimide, and polymeric carbodimide. Modified styrene acrylic polymer may also serve as a tri-functional chain extender for polymer matrix chains. Carbodimides may also serve as anti-hydrolysis agents. The modified styrene acrylic polymer, monomeric carbodimide, and/or polymeric carbodimide may be added to the reinforced resin composition before, at the same time, or after the inorganic filler is added to the reinforced resin composition. According to some embodiments, the modified styrene acrylic polymer, monomeric carbodimide, and/or polymeric carbodimide may be added to the reinforced resin composition before, at the same time, or after organic groups are added to the inorganic filler.

According to some embodiments, the resin composition described herein may include at least one additional component, for example, plasticizers, impact modifiers, pigments, dyes, colorants, stabilizers, and/or other additives or processing aids.

According to some embodiments, the inorganic filler functionalized with the functionalizing agent may have a reduced moisture adsorption by at least 45%, when tested at 97% relative humidity and 23° C. for 120 hours, relative to the inorganic filler when it has not been functionalized. According to some embodiments, a splay formation may be reduced as compared to the splay formation relative to a reinforce resin composition including the inorganic filler when it has not been functionalized.

According to some embodiments, the inorganic filler may have a purity greater than 85%. For example, the inorganic filler may have a purity greater than 88%, greater than 90%, greater than 92%, greater than 95%, or greater than 97%. According to some embodiments, the inorganic filler may be talc that has a purity greater than 85%. For example, the talc may have a purity greater than 88%, greater than 90%, greater than 92%, greater than 95%, or greater than 97%.

In some embodiments, there is disclosed a method of reducing thermal degradation of a reinforced polycarbonate material using the combination of materials described herein. For example, the method may include introducing into a polycarbonate material at least one inorganic filler, that has been functionalized to a level sufficient to modify the surface activity of the inorganic filler such that the reinforced resin exhibits a melt flow index of 25 or less, such as 20 or less, when measured under the conditions described herein, e.g., at a load of 1.2 kg, after allowing the resin to remain at a temperature of 300° C. for a time of 10 minutes. According to some embodiments, the introducing step may include a shear mixing step. According to some embodiments, the shear mixing step may include extrusion.

According to some embodiments of the method, the inorganic filler functionalized with the functionalizing agent may have a reduced moisture adsorption by at least 45%, when tested at 97% relative humidity and 23° C. for 120 hours, relative to the inorganic filler when it has not been functionalized. According to some embodiments, a splay formation may be reduced as compared to the splay formation relative to a reinforce resin composition including the inorganic filler when it has not been functionalized.

According to some embodiments of the method, the inorganic filler may have a purity greater than 85%. For example, the inorganic filler may have a purity greater than 88%, greater than 90%, greater than 92%, greater than 95%, or greater than 97%. According to some embodiments, the inorganic filler may be talc that has a purity greater than 85%. For example, the talc may have a purity greater than 88%, greater than 90%, greater than 92%, greater than 95%, or greater than 97%.

As used herein, "modifying the surface activity of the inorganic filler" typically includes isolating a majority of active sites on the surface of the inorganic filler. This can be accentuated by treating the surface of the inorganic filler prior to it being functionalized, such as by treating the surface of the inorganic filler with a step that is sufficient to increase the hydrophobicity of the inorganic filler.

The inorganic fillers that can be used in the disclosed methods include those minerals that were previously described, and are chosen from talc, such as macrocrystalline talc having a $d_{50}$ ranging from 0.5 to 5 µm; mica, such as phlogopite mica, or muscovite mica; kaolin, such as hydrous kaolin; perlite, and combinations thereof.

In some embodiments, the method includes adding at least one additional component chosen from plasticizers, impact modifiers, pigments, dyes, colorants, stabilizers, and processing aids.

The functionalizing agents that can be attached to the inorganic fillers in the disclosed methods are those organo-modified silane that were previously described, and are chosen from a methacrylate-silane (3-methacryl oxypropyl trimethoxysilane), a vinyl silane (vinyltriethoxysilane, vinyltriethoxysilane, and combinations thereof), a phenyl silane (phenytrimethoxysilane), an epoxy silane (3-glacidoxypropyl trimethoxysilane), and combinations thereof. According to some embodiments, the functionalizing agent may include at least one of modified styrene acrylic polymer, monomeric carbodimide, and polymeric carbodimide.

According to some embodiments, inorganic fillers functionalized with functionalizing agents as described herein may result in reduced moisture adsorption of the functionalized inorganic fillers as compared to the same inorganic fillers that have not been functionalized with the functionalizing agents. Moisture adsorption of inorganic fillers is believed to be associated with the stability of polycarbonates including the inorganic fillers. In particular, higher moisture adsorption of inorganic fillers may reduce the stability of polycarbonates including the inorganic fillers.

According to some embodiments, the inorganic filler may include a micronized microcrystalline talc treated with MEMO-silane. Treatment with the MEMO-silane may reduce moisture adsorption by at least 40% when tested at 97% relative humidity and 23° C. for 120 hours, relative to the talc in its untreated form. For example, the inorganic filler of micronized microcrystalline talc treated with MEMO-silane may reduce moisture adsorption by at least 45%, at least 50%, at least 55%, or at least 60%, when tested at 97% relative humidity and 23° C. for 120 hours, relative to the talc in its untreated form. According to some embodiments, the inorganic filler, prior to being functionalized, may include a mean particle size ranging from 1 micron to 3 microns (e.g., 2 microns), a Hegman fineness of grind ranging from 5 to 7 (e.g., 6), a 325 mesh (% passing) ranging from 90 to 100% (e.g., 100%), an oil absorption ranging from 35 to 45 grams oil/100 grams talc (e.g., 41 grams oil/100 grams talc), a specific gravity ranging from 2.0 to 3.5 (e.g., 2.8), and a bulking value ranging from 20 to 27 lbs/gallon (e.g., 23.3 lbs/gallon).

The features and advantages of the present invention maybe more fully shown by the following examples, which are provided for purposes of illustration, and are not to be construed as limiting the invention in any way.

EXAMPLES

Example 1

In this example, an evaluation of the effect of minerals on PC resin was evaluated on micro- and macro-crystalline talc and phlogopite mica.

A general purpose PC resin (Lexan™ 141) was used in this study. Minerals were added to this PC resin at a relatively high loading (20%) to ensure any effect was clearly intensified in the results. For compounding, 50 grams of compound was prepared for each formulation using a Brabender batch mixer.

The minerals tested in this Example were a macrocrystalline talc made using Chinese Guangxi ore (7 Hegman with $d_{50}$ of about 2 µm); and a fine phlogopite mica (sedigraph $d_{50}$ of about 8-10 µm).

All surface treatments were conducted at 0.5 wt % loading based on the dried mineral. The following surface treatment additive was tested: a MEMO-silane (3-trimethoxysilylpropyl metacrylate).

The melt flow index (WI) was measured at 1.2 kg load at 300° C. after allowing the resin or compound to remain at 300° C. inside the tester for 10 minutes. Unfilled PC resin was used as a baseline for comparison.

Table 1 shows the effect of moisture and the behavior of unfilled PC and filled compounds. The results show that talc and mica both clearly increased the melt flow, which was attributed to PC degradation. Drying had no clear effect on the melt flow of unfilled PC, but drying the filled PC compounds significantly reduced the melt flow compared to undried compounds (both for talc and mica). This suggested that water/moisture played a role in intensifying the effect of minerals on PC degradation at elevated temperatures.

TABLE 1

Effect of minerals and drying on PC degradation, shown by MFI.

| Mineral/Condition | 10 min MFI ||
|---|---|---|
| | Dried | Not Dried |
| Unfilled | 11.5 | 10.6 |
| Microcrystalline Talc* | 119.0 | 786 |
| Phlogopite mica | 31.9 | 66.6 |

*This microcrystalline talc was modified with 0.5% by weight organo-modified alkyl siloxane from Evonik (45% emulsion in water).

Example 2

As in Example 1, surface treated or untreated minerals compounded at 20 wt % loading in a general purpose PC resin (Lexan™ 141) were tested for PC degradation properties. This example evaluated additional minerals and surface treatments not tested in Example 1. In particular, this Example evaluated Muscovite mica, kaolin, chlorite, perlite, and additional macro-crystalline talcs.

Based on the positive results with MEMO silane in Example 1, MEMO silane was used for the surface treatment of all minerals tested in this Example (except talc).

Melt flow index was again measured at 1.2 kg load at 300° C. after allowing the resin or compound to remain at 300° C. inside the tester 1) for 10 minutes, and 2) for 30 minutes. Unfilled PC resin was used as a baseline for comparison.

As summarized in Table 2, for every mineral, surface treatment with MEMO silane significantly reduced PC degradation.

TABLE 2

Effect on PC degradation, as determined by melt-flow-index (MFI), for various minerals surface treated with MEMO-silene.

| Mineral | Untreated filler (MFI) | MEMO-Silane Treated filler (MFI) |
|---|---|---|
| Muskovite Mica | 35.0 | 14.1 |
| Calcined Kaolin | 62.4 | 16.3 |
| Hydrous Kaolin | 128.8 | 32.9 |
| Chlorite | 55.9 | 33.5 |

Example 3

In this example, 2 µm Chinese Guangxi talc was treated with 2 wt % MEMO silane or vinyl silane and loaded into a PC resin (LEXAN™ 141) at 20 wt % loading. The results in Table 3 below show the MFI before and after drying at 300° C. for 10 minutes. As shown in Table 3, the results demonstrate the efficacy of the silane treatment, such as, a MEMO-silane treatment.

TABLE 3

Effect on PC degradation, as determined by melt-flow-index (MFI), for various minerals surface treated with MEMO-silane.

| Mineral/Condition | 10 min MFI | |
|---|---|---|
| | Dried | Not Dried |
| Unfilled PC | 10.5 | |
| PC with MEMO treated talc | 11.6 | 11.3 |
| PC with vinyl silane treated talc | 19.5 | 16.4 |

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

Other embodiments of the invention will be apparent to those skilled in the art from consideration of the specification and practice of the embodiments disclosed herein. It is intended that the specification and examples be considered as exemplary only, with the true scope of the invention being indicated by the following claims.

What is claimed is:

1. A reinforced resin composition comprising:
a polycarbonate in an amount ranging from 75 to 99 percent by weight of the resin composition;
a functionalizing agent; and
an inorganic filler functionalized with the functionalizing agent, the functionalized inorganic filler being present in an amount ranging from 1 to 25 percent by weight of the resin composition;
wherein the reinforced resin exhibits a melt flow index of 25 or less, when measured at a load of 1.2 kg, after allowing the resin to remain at a temperature of 300° C. for 10 minutes;
wherein a splay formation is reduced as compared to the splay formation relative to a reinforce resin composition including the inorganic filler when it has not been functionalized.

2. The reinforced resin composition of claim 1, wherein the functionalizing agent comprises at least one organo-modified silane chosen from a methacrylate-silane (MEMO-silane), a vinyl silane, a phenyl silane, an epoxy silane, or combinations thereof.

3. The reinforced resin composition of claim 2, wherein the functionalizing agent further comprises at least one of modified styrene acrylic polymer, monomeric carbodimide, or polymeric carbodimide.

4. The reinforced resin composition of claim 1, wherein the functionalizing agent comprises at least one of modified styrene acrylic polymer, monomeric carbodimide, or polymeric carbodimide.

5. The reinforced resin composition of claim 1, wherein the inorganic filler comprises talc, mica, kaolin, perlite, or combinations thereof.

6. The reinforced resin composition of claim 5, wherein the inorganic filler comprises talc having a $d_{50}$ ranging from 0.5 to 5 µm, and comprises low BET macrocrystalline talc.

7. The reinforced resin composition of claim 1, wherein the functionalized inorganic filler exhibits a melt flow index of 20 or less.

8. The reinforced resin composition of claim 1, wherein the inorganic compound exhibits a surface area less than 12 $m^2/g$.

9. The reinforced resin composition of claim 1, further including at least one additional component chosen from plasticizers, impact modifiers, pigments, dyes, colorants, stabilizers, or processing aids.

10. The reinforced resin composition of claim 1, wherein the inorganic filler functionalized with the functionalizing agent has a reduced moisture adsorption by at least 45%, when tested at 97% relative humidity and 23° C. for 120 hours, relative to the inorganic filler when it has not been functionalized.

11. A method of reducing thermal degradation of a reinforced polycarbonate material, said method comprising:
introducing into said polycarbonate material at least one inorganic filler that has been functionalized with a functionalizing agent to modify the surface activity of said inorganic filler, such that the reinforced resin exhibits a melt flow index of 25 or less, when measured at a load of 1.2 kg, after allowing the resin to remain at a temperature of 300° C. for 10 minutes.

12. The method of claim 11, wherein the functionalizing agent comprises at least one organo-modified silane chosen from a methacrylate-silane (MEMO-silane), a vinyl silane, a phenyl silane, an epoxy silane, or combinations thereof.

13. The method of claim 12, wherein the functionalizing agent further comprises at least one of modified styrene acrylic polymer, monomeric carbodimide, or polymeric carbodimide.

14. The method of claim 11, wherein the functionalizing agent comprises at least one of modified styrene acrylic polymer, monomeric carbodimide, or polymeric carbodimide.

15. The method of claim 11, wherein the inorganic filler comprises talc, mica, kaolin, perlite, or combinations thereof.

16. The method of claim 11, wherein the inorganic filler comprises talc having a $d_{50}$ ranging from 0.5 to 5 µm, and comprises macrocrystalline talc having a surface area less than 12 $m^2/g$.

17. The method of claim 11, wherein the functionalized inorganic filler exhibits a melt flow index of 20 or less.

18. The method of claim 11, further comprising at least one component chosen from plasticizers, impact modifiers, pigments, dyes, colorants, stabilizers, or processing aids.

19. The method of claim 11, wherein the inorganic filler functionalized with the functionalizing agent has a reduced moisture adsorption by at least 45%, when tested at 97% relative humidity and 23° C. for 120 hours, relative to the inorganic filler when it has not been functionalized.

20. The method of claim 11, wherein a splay formation is reduced as compared to the splay formation relative to a reinforced polycarbonate material including the inorganic filler when it has not been functionalized.

* * * * *